US006352650B1

(12) United States Patent
Inoue

(10) Patent No.: US 6,352,650 B1
(45) Date of Patent: Mar. 5, 2002

(54) MANGANESE-ZINC FERRITE AND MAKING METHOD

(75) Inventor: Shoji Inoue, Chiba (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/558,587

(22) Filed: Apr. 26, 2000

Related U.S. Application Data

(63) Continuation of application No. PCT/JP99/04838, filed on Sep. 7, 1999.

(30) Foreign Application Priority Data

Sep. 7, 1998 (JP) .......................................... 10-268923

(51) Int. Cl.[7] .............................................. H01F 1/34
(52) U.S. Cl. ............................... 252/62.62; 252/62.63; 264/666; 264/611
(58) Field of Search .......................... 252/62.62, 62.63; 264/611, 666

(56) References Cited

U.S. PATENT DOCUMENTS

| | | | | |
|---|---|---|---|---|
| 3,843,541 A | * | 10/1974 | Chiba et al. ............. | 252/62.62 |
| 5,498,361 A | * | 3/1996 | Matsukawa et al. ..... | 252/62.62 |
| 5,779,930 A | | 7/1998 | Inoue ...................... | 252/62.62 |
| 5,846,448 A | | 12/1998 | Yasuhara et al. ........ | 252/62.56 |

FOREIGN PATENT DOCUMENTS

| | | | |
|---|---|---|---|
| JP | 61-117804 | | 6/1986 |
| JP | 61-117804 A | * | 6/1986 |
| JP | 62-97114 A | * | 5/1987 |
| JP | 6-204025 | | 7/1994 |
| JP | 2914554 B2 | * | 1/1996 |
| JP | 2914554 | | 4/1999 |

* cited by examiner

Primary Examiner—C. Melissa Koslow
(74) Attorney, Agent, or Firm—Oblon, Spivak, McClelland, Maier & Neustadt, P.C.

(57) ABSTRACT

The invention aims to provide a manganese-zinc ferrite exhibiting a high initial permeability over a broad band and especially in a low-frequency region of about 10 kHz and a method for preparing the same. A method for preparing a manganese-zinc ferrite by firing is characterized in that the firing includes a main temperature holding step at 1,200–1,450° C. and a thermal ramp-down step prior to the main temperature holding step, and the lowest temperature reached by the mid-firing thermal ramp-down step is set in the range of 1,000–1,400° C. and lower by at least 50° C. than the hold temperature of the main holding step, thereby obtaining a manganese-zinc ferrite comprising 50–56 mol % calculated as $Fe_2O_3$ of iron oxide, 22–39 mol % calculated as MnO of manganese oxide, and 8–25 mol % calculated as ZnO of zinc oxide as main components, and having a mean crystal grain size of more than 50 μm to 150 μm.

6 Claims, 3 Drawing Sheets

COMPARATIVE EXAMPLE

MANGANESE-ZINC FERRITE AND MAKING METHOD

This application is a Continuation of International application no. PCT/JP99/04838 filed on Sep. 7, 1999.

TECHNICAL FIELD

This invention relates to a manganese-zinc ferrite and a method for preparing the same, and more particularly, to a manganese-zinc ferrite having a high initial magnetic permeability $\mu i$ suitable for use as the core of broad-band transmission transformers and a method for preparing the same.

BACKGROUND ART

In order for broad-band transmission transformers, for example, pulse transformers to ensure accurate digital communication, there is a need for core-forming manganese-zinc ferrite having a high broad-band permeability and exhibiting a high permeability throughout the region of 10 to 500 kHz.

To meet such a demand, the applicant provided in JP-A 6-204025 a manganese-zinc ferrite having a high broad-band permeability and exhibiting a high permeability throughout the region of 10 to 500 kHz. The manganese-zinc ferrite disclosed in this patent publication is a manganese-zinc ferrite containing 50 to 56 mol % calculated as $Fe_2O_3$ of iron oxide, 22 to 39 mol % calculated as MnO of manganese oxide, and 8 to 25 mol % calculated as ZnO of zinc oxide, which has been fired after adding thereto up to 800 ppm calculated as $Bi_2O_3$ of a bismuth oxide component and up to 1,200 ppm calculated as $MoO_3$ of a molybdenum oxide component.

The manganese-zinc ferrite disclosed in this patent publication exhibits a high initial permeability over a broad band as demonstrated by an initial permeability of at least 9,000, at least 9,000, and at least 3,000 at 25° C. and 10 kHz, 100 kHz, and 500 kHz, respectively.

DISCLOSURE OF THE INVENTION

In order for pulse transformers as described above to realize size reduction and fast communication, it is important that the ferrite exhibits a higher initial permeability especially in a low-frequency region of about 10 kHz. This enables to sharpen the rise of output pulses and reduce the working attenuation even when the number of windings is reduced, ensuring accurate digital communication.

It is, therefore, an object of the present invention to provide a manganese-zinc ferrite exhibiting a high initial permeability over a broad band and especially in a low-frequency region of about 10 kHz and a method for preparing the same.

(1) A manganese-zinc ferrite comprising 50 to 56 mol % calculated as $Fe_2O_3$ of iron oxide, 22 to 39 mol % calculated as MnO of manganese oxide, and 8 to 25 mol % calculated as ZnO of zinc oxide as main components, and having a mean crystal grain size of more than 50 $\mu$m to 150 $\mu$m.

(2) The manganese-zinc ferrite of (1) which contains, based on the main components, up to 800 ppm calculated as $Bi_2O_3$ of a bismuth oxide component and up to 1,200 ppm calculated as $MoO_3$ of a molybdenum oxide component as auxiliary components.

(3) The manganese-zinc ferrite of (1) or (2) further containing 50 to 500 ppm calculated as CaO of calcium oxide.

(4) The manganese-zinc ferrite of any one of (1) to (3) which has a magnetic permeability $\mu_{100}$ as measured at a frequency of 10 kHz and a magnetic flux density B of 100 millitesla and a magnetic permeability $\mu_1$ as measured at a frequency of 10 kHz and a magnetic flux density B of 1 millitesla, the permeability $\mu_{100}$ being at least 1.20 times the permeability $\mu_1$.

(5) The manganese-zinc ferrite of any one of (1) to (4) which has an initial magnetic permeability $\mu i$ of at least 15,000 at 10 kHz.

(6) The manganese-zinc ferrite of any one of (1) to (5) which has experienced at least one thermal ramp-down step during firing.

(7) A method for preparing a manganese-zinc ferrite by firing, characterized in that the firing includes a main temperature holding step at 1,200 to 1,450° C. and a thermal ramp-down step prior to the main temperature holding step, and the lowest temperature reached by the mid-firing thermal ramp-down step is set in the range of 1,000 to 1,400° C. and lower by at least 50° C. than the hold temperature of the main temperature holding step.

(8) The method for preparing a manganese-zinc ferrite of (7) wherein the manganese-zinc ferrite of any one of (1) to (6) is obtained.

FUNCTION AND ADVANTAGES OF THE INVENTION

Figure 1:
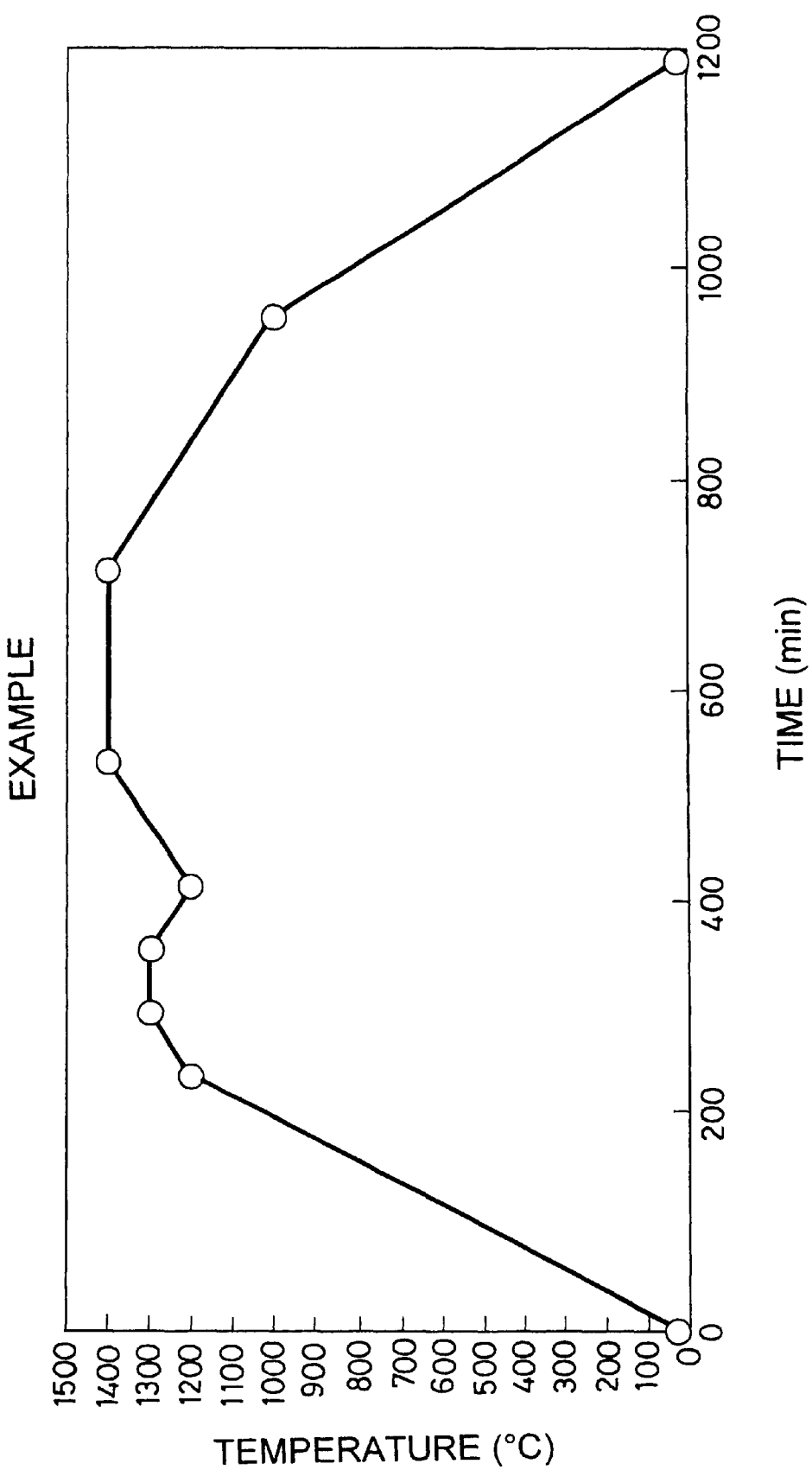
FIG. 1 is a diagram showing a temperature profile during firing in Example.

According to the invention, the hold temperature of a main temperature holding step during firing of manganese-zinc ferrite is set in the range of 1,200 to 1,450° C., a thermal ramp-down step is provided prior to the main temperature holding step, and the lowest temperature reached by the mid-firing thermal ramp-down step is set in the range of 1,000 to 1,400° C. and lower by at least 50° C. than the hold temperature of the main temperature holding step (the lowest temperature being expressed by "temperature drop," hereinafter). These settings prevent abnormal crystal growth and ensure to produce a manganese-zinc ferrite having a mean crystal grain size of more than 50 $\mu$m to 150 $\mu$m and preferably an initial magnetic permeability of at least 15,000 at 10 kHz. When a core obtained from the manganese-zinc ferrite of the invention is incorporated in a pulse transformer, for example, it becomes possible to sharpen the rise of output pulses and reduce the working attenuation even when the number of windings is reduced, thereby enabling size reduction and fast accurate digital communication.

As compared with prior art manganese-zinc ferrites, the manganese-zinc ferrite of the invention exhibits at least equal initial permeability at 100 kHz. When transformers are constructed using the inventive ferrite, the number of windings can be reduced, contributing to a size reduction of transformers.

Further, the manganese-zinc ferrite of the invention exhibits the unique feature that its magnetic permeability $\mu_{100}$ as measured at 10 kHz and a magnetic flux density B of 100 millitesla is at least 1.20 times its magnetic permeability $\mu_1$ as measured at 10 kHz and a magnetic flux density B of 1 millitesla. Notably, prior art manganese-zinc ferrites have a permeability $\mu_{100}$/permeability $\mu_1$ of about 1.10 at maximum.

Japanese Patent No. 2,914,554 discloses a very efficient method for preparing a high performance, high permeability manganese-zinc ferrite at a low cost by firing manganese-zinc ferrite at least two times. This patent discloses a mid-firing thermal ramp-down step of the same concept as the mid-firing thermal ramp-down step according to the invention, with the lowest temperature of that mid-firing thermal ramp-down step being preferably up to 1,100° C., more preferably up to 1,000° C., and most preferably up to 500° C. This description is interpreted to mean that the lowest temperature of the mid-firing thermal ramp-down step is desirably set as low as possible.

In contrast, the invention requires that the lowest temperature of the mid-firing thermal ramp-down step fall within the range of 1,000 to 1,400° C. The invention also requires that the temperature drop in the mid-firing thermal ramp-down step be at least 30° C., and especially at least 50° C. The reason why the lowest temperature of the mid-firing thermal ramp-down step is set within the range of 1,000 to 1,400° C. will be described later. With this setting, the firing method of the invention can reduce the time taken for the mid-firing thermal ramp-down step, which is long in the above-referred prior art firing method, thereby reducing the overall manufacture time.

The present invention primarily aims to improve the initial permeability in a low-frequency region of about 10 kHz whereas the above-referred prior art method aims to improve the initial permeability in a high-frequency region of at least 100 kHz. The object of the present invention thus differs from the object of the prior art method.

BEST MODE FOR CARRYING OUT THE INVENTION

Illustrative embodiments of the present invention are described in detail.

The method for preparing a manganese-zinc ferrite according to the invention is characterized in that when a compact of calcined ferrite material is being fired, the hold temperature of a main temperature holding step is set within the range of 1,200 to 1,450° C., especially 1,350 to 1,450° C., and a thermal ramp-down step is provided prior to the main temperature holding step, the lowest temperature reached by the mid-firing thermal ramp-down step is set in the range of 1,000 to 1,400° C., and the temperature drop of the thermal ramp-down step is set to at least 30° C., especially at least 50° C.

The hold temperature of the main temperature holding step during firing is set in the range of 1,200 to 1,450° C. because this setting is effective for promoting ferrite formation and controlling the crystal grain size. Given this temperature range, the initial permeability at 10 kHz is significantly improved. The hold time of the main temperature holding step is preferably about ½ to about 10 hours.

The lowest temperature reached by the mid-firing thermal ramp-down step is set in the range of 1,000 to 1,400° C. because it is believed that this setting is effective for relieving the stresses between crystal grains and grain boundaries.

The lowest temperature is preferably 1,100 to 1,350° C., especially 1,150 to 1,300° C., and more preferably 1,200 to 1,3000° C.

If the temperature drop is less than 50° C., the thermal ramping-down during firing becomes less effective and achieves a less improvement in initial permeability at 10 kHz. The temperature drop is preferably 100 to 250° C., and especially 150 to 200° C.

It is noted that the mid-firing thermal ramp-down step may include a temperature holding step at the lowest temperature. The temperature holding step at the lowest temperature, if provided, is preferably within 3.0 hours.

The ramp-down rate in the mid-firing thermal ramp-down step is preferably set at 20 to 300° C./hour, more preferably 30 to 200° C./hour, and the heating rate is preferably set at 20 to 300° C./hour, more preferably 30 to 200° C./hour. The mid-firing thermal ramp-down step is preferably carried out within 6.0 hours.

The mid-firing thermal ramp-down step is preferably provided immediately prior to the main temperature holding step although this is not essential to produce the manganese-zinc ferrite of the invention.

Prior to the mid-firing thermal ramp-down step, there is provided a pre-firing or pre-holding step. In the pre-firing or pre-holding step, the highest temperature is equal to or lower than the hold temperature of the main temperature holding step and higher than the lowest temperature of the mid-firing thermal ramp-down step. Specifically, the highest temperature is preferably about 1,100 to 1,400° C. The highest temperature may appear as a peak or be held within 5.0 hours. In the following description, the step in which the highest temperature appears as a peak and the hold time is instantaneous is also referred to as the pre-holding step.

In the firing according to the invention, a heating step preceding the pre-holding step and a cooling step following the main temperature holding step may use the same temperature profiles as used in prior art firing processes. Specifically, the heating step preferably uses a heating rate of 20 to 500° C./hour. This heating rate may be changed in two or more stages, in which case it is preferred that the heating rate is initially high and gradually becomes slower. In two stages of heating, for example, it is preferred that the heating rate of the first stage is about 200 to 500° C./hr and the heating rate of the second stage is about 20 to 200° C. On the other hand, the cooling step preferably uses a cooling rate of 20 to 500° C./hr. This cooling rate may also be changed in two or more stages. In two stages of cooling, for example, it is preferred that the cooling rate of the first stage is about 20 to 200° C./hr and the cooling rate of the second stage is about 200 to 500° C.

The furnace used in the firing of the invention may be either continuous or batchwise. The firing atmosphere may be adjusted in accordance with the theory of equilibrium oxygen partial pressure. Firing is preferably carried out in a nitrogen atmosphere having a controlled oxygen partial pressure (including an atmosphere consisting of oxygen).

By firing under the above-specified conditions according to the invention, there is obtained a manganese-zinc ferrite having a mean crystal grain size of more than 50 $\mu$m to 150 $\mu$m and an initial permeability of at least 15,000 at 10 kHz.

The manganese-zinc ferrite of the invention has a mean crystal grain size of preferably more than 50 $\mu$m to 150 $\mu$m, more preferably 60 to 130 $\mu$m, and most preferably 70 to 120 $\mu$m. Also the manganese-zinc ferrite of the invention should preferably contain at least 50%, more preferably at least 70%, and especially at least 80% by volume of manganese-zinc ferrite having a mean crystal grain size of preferably more than 50 $\mu$m to 140 $\mu$m. Also preferably the manganese-zinc ferrite of the invention has an initial magnetic permeability of at least 20,000 and more preferably at least 25,000 at 10 kHz. The initial permeability at 10 kHz of the manganese-zinc ferrite of the invention has marked a maximum of about 35,000 up to the present, with higher values being preferable.

The manganese-zinc ferrite of the invention has a magnetic permeability $\mu_{100}$ as measured at 10 kHz and a magnetic flux density B of 100 millitesla and a magnetic permeability $\mu_1$ as measured at 10 kHz and a magnetic flux density B of 1 millitesla, the permeability $\mu_{100}$ being at least 1.20 times the permeability $\mu_1$. The inventive ferrite has marked a maximum $\mu_{100}/\mu_1$ of about 1.50 up to the present.

The invention is applicable to a manganese-zinc ferrite of a widely varying composition although the above-described main components are preferably limited to about 50 to 56 mol % calculated as $Fe_2O_3$, about 22 to 39 mol % calculated as MnO, and about 8 to 25 mol % calculated as ZnO. Outside this range, there is a tendency that the initial permeability at 10 kHz declines.

Also the manganese-zinc ferrite of the invention may contain calcium oxide or silicon oxide as auxiliary components. These auxiliary components are about 50 to 500 ppm, especially about 100 to 300 ppm calculated as CaO and about 50 to 150 ppm calculated as $SiO_2$. Note that CaO and $SiO_2$ are usually present at grain boundaries.

The ferrite of the invention preferably contains bismuth oxide and molybdenum oxide, especially in the form of $Bi_2O_3$ and $MoO_3$. In this embodiment, the bismuth and molybdenum oxide components, especially molybdenum oxide component, when added, can partially evaporate or sublimate upon firing. In such cases, the content of bismuth oxide or molybdenum oxide in the ferrite does not coincide with the charge. Namely, the content of bismuth oxide is preferably about 50 to 100% by weight of the charge calculated as $Bi_2O_3$, and the content of molybdenum oxide is preferably about 10 to 60% by weight, especially about 10 to 30% by weight of the charge calculated as $MoO_3$.

In the ferrite of the invention, there may be contained at least one of niobium oxide, indium oxide, vanadium oxide, tantalum oxide and zirconium oxide if necessary. These oxides are preferably contained in a total amount of 0 to about 3,000 ppm calculated as $Nb_2O_5$, $In_2O_3$, $V_2O_5$, $Ta_2O_5$, and $ZrO_2$.

The ferrite containing the above-described components according to the invention should preferably have a mean crystal grain size of more than 50 $\mu$m to 150 $\mu$m. With too greater or smaller a mean grain size, the initial permeability at 10 kHz declines, probably failing to accomplish an initial permeability of 15,000 at 10 kHz. The mean grain size is determined by etching a mirror polished surface with acid, observing the etched surface under an optical microscope, determining the diameters of circles equivalent to polycrystalline bodies observed, and calculating an average thereof.

Where the mean grain size is large and has a uniform narrow distribution, the ferrite accomplishes an initial permeability at 25° C. and 10 kHz of at least 15,000, especially at least 20,000, further especially at least 25,000, for example, 15,000 to 35,000. At the same time, the inventive ferrite exhibits an initial permeability which is at least equal to the initial permeability of prior art ferrites, as demonstrated by an initial permeability at 100 kHz of at least 8,000, especially at least 9,000, further especially at least 9,500, for example, about 9,500 to 15,000 and an initial permeability at 500 kHz of at least 2,000, especially at least 3,000, further especially at least 3,500, for example, about 3,500 to 6,000.

The manganese-zinc ferrite of the invention is prepared by first furnishing a mixture of conventional iron oxide, manganese oxide and zinc oxide components as main components. These main components are mixed so that the final composition of ferrite may fall within the above-specified proportion, and used as a raw material. To this, calcium carbonate or another calcium compound capable of forming calcium oxide upon firing or calcium oxide and a silicon compound capable of forming silicon oxide upon firing or silicon oxide are added as raw materials of auxiliary components. These raw materials of auxiliary components are added so that the final composition of magnetic material may fall within the above-specified proportion.

Additionally, bismuth oxide and molybdenum oxide components are added. The bismuth oxide component used may be selected from $Bi_2O_3$, $Bi_2(SO_4)_3$, etc., with $Bi_2O_3$ being preferred. The amount of the bismuth oxide component added is up to 800 ppm, especially up to 600 ppm, preferably 100 to 400 ppm calculated as $Bi_2O_3$. If the charge exceeds this range, then the initial permeability rather declines.

The molybdenum oxide component used may be selected from $MoO_3$, $MoCl_3$, etc., with $MoO_3$ being preferred. The amount of the molybdenum oxide component added is up to 1,200 ppm, especially up to 1,000 ppm, preferably 100 to 1,000 ppm calculated as $MoO_3$. If the charge exceeds this range, then the initial permeability rather declines. If necessary, at least one of niobium oxide, indium oxide, vanadium oxide, tantalum oxide and zirconium oxide is added to the raw material mixture.

After the main components and additive minor components are mixed in this way, a small amount, for example, 0.1 to 1.0% by weight of a suitable binder such as polyvinyl alcohol is added to the mixture. The mixture is atomized into granules with a diameter of 80 to 200 $\mu$m by means of a spray dryer, which are shaped into a compact.

The compact is then fired. The firing conditions are as described above.

In this way, there is obtained a manganese-zinc ferrite according to the invention.

EXAMPLE

Examples of the invention are given below by way of illustration.

Example 1

A sample was obtained by furnishing 24 mol % of MnO, 23 mol % of ZnO, and 53 mol % of $Fe_2O_3$ as main components and adding thereto 200 ppm (calculated as CaO in the final composition of magnetic material) of $CaCO_3$, 100 ppm (in the final composition of magnetic material) of $SiO_2$, 200 ppm of $Bi_2O_3$, and 200 ppm of $MoO_3$ as auxiliary components.

After these components were mixed and a binder was added thereto, the mixture was atomized into granules with a mean particle size of 150 $\mu$m by means of a spray dryer. By shaping the granules, 100 compacts were obtained. Fifty compacts were fired in an atmosphere having a controlled oxygen partial pressure in accordance with each of the temperature profiles shown in FIG. 1 (Example) and FIG. 2 (Comparative Example), obtaining toroidal cores having an outer diameter of 6 mm, an inner diameter of 3 mm and a height of 1.5 mm.

Figure 2:
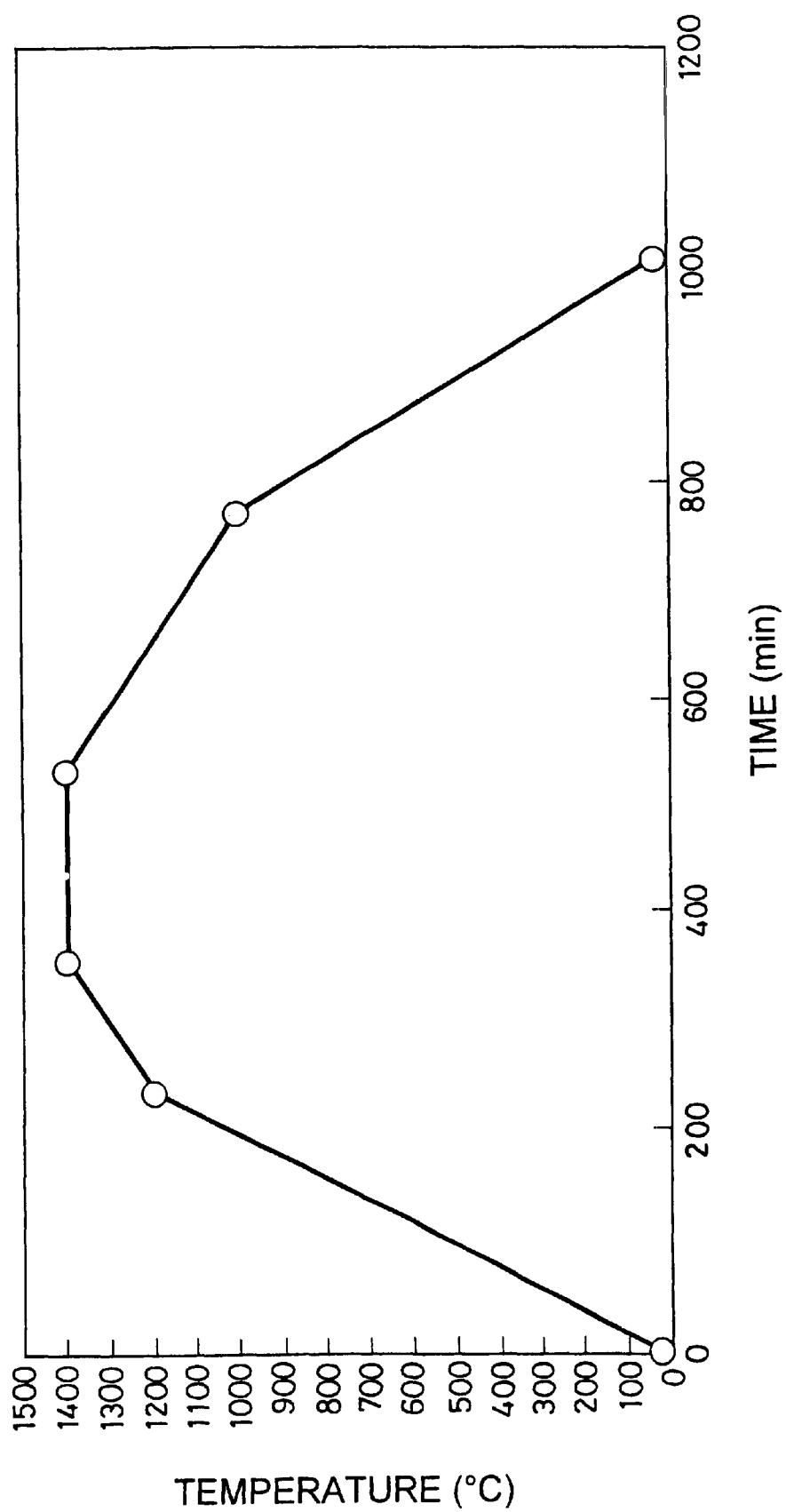
FIG. 2 is a diagram showing a temperature profile during firing in Comparative Example.

The temperature profiles shown in FIG. 1 (Example) and FIG. 2 (Comparative Example) are described below.

Temperature Profile of Example

Heating step:

heating rate up to 1200° C.: 300° C./hr heating rate from 1200° C. to 1300° C.: 100° C./hr
Pre-holding step:
hold at 1300° C. for 1.0 hour
Mid-firing thermal ramp-down step:
lowest temperature: 1200° C.
 (difference from hold temperature of main temperature holding step: 200° C.)
ramp-down rate from 1300° C. to 1200° C.: 100° C./hr
ramp-up rate from 1200° C. to 1400° C.: 100° C./hr
Main temperature holding step:
hold at 1400° C. for 3.0 hours
Cooling step:
cooling rate from 1400° C. to 1000° C.: 100° C./hr
cooling rate from 1000° C. to room temperature: 250° C./hr Temperature Profile of Comparative Example Heating step:
heating rate up to 1200° C.: 300° C./hr
heating rate from 1200° C. to 1400° C.: 100° C./hr
Pre-holding step:
omitted
Mid-firing thermal ramp-down step:
omitted
Main temperature holding step:
hold at 1400° C. for 3.0 hours
Cooling step:
cooling rate from 1400° C. to 1000° C.: 100° C./hr
cooling rate from 1000° C. to room temperature: 250° C./hr That is, the temperature profile of Comparative Example is the temperature profile of Example minus the pre-holding step and the mid-firing thermal ramp-down step.

The final composition of the samples of Example and Comparative Example was examined by fluorescent x-ray analysis to find that the main components and Ca and Si substantially corresponded to the composition of raw materials and the contents of bismuth oxide and molybdenum oxide were 10 to 80% by weight of the respective charges.

Each of the toroidal cores thus obtained was measured for initial permeability at 25° C. and 10 kHz, 100 kHz and 500 kHz and mean crystal grain size. It is noted that an impedance analyzer was used for permeability measurement. 10 The results are shown in Table 1.

TABLE 1

|  | Mean crystal grain size | Initial permeability $\mu i$ | | |
| --- | --- | --- | --- | --- |
|  | ($\mu$m) | 10 kHz | 100 kHz | 500 kHz |
| Sample 1* | 27 | 13000 | 12600 | 3300 |
| Sample 2* | 30 | 15600 | 13200 | 3500 |
| Sample 3* | 33 | 17800 | 11400 | 2800 |
| Sample 4 | 52 | 22900 | 11800 | 3700 |
| Sample 5 | 67 | 27500 | 12000 | 4000 |
| Sample 6 | 89 | 35700 | 15100 | 5200 |
| Sample 7 | 114 | 33400 | 14400 | 4700 |
| Sample 8 | 132 | 30200 | 12700 | 4260 |
| Sample 9 | 146 | 28200 | 11100 | 3900 |

*outside the scope of the invention

The effectiveness of the invention is evident from the results shown in Table 1. Specifically, the samples having a mean crystal grain size as large as 52 to 146 $\mu$m according to the invention have a significantly higher initial permeability at 10 kHz than the prior art samples and an initial permeability at 100 kHz which is at least equal to that of the prior art samples. In the samples of Example, crystal grains with a size of more than 50 $\mu$m to 140 $\mu$m accounted for at least 80% by volume.

Figure 3:
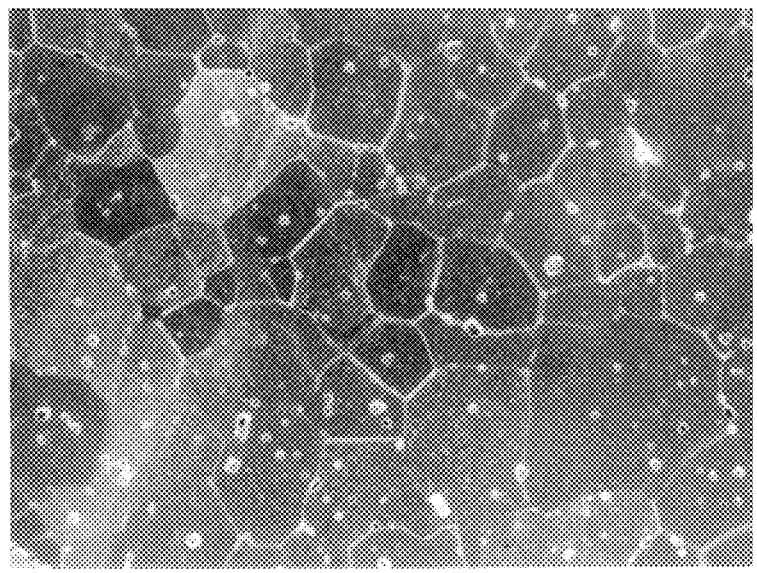
FIG. 3 is a figure-substitute photograph showing a section of an inventive sample.
Figure 4:
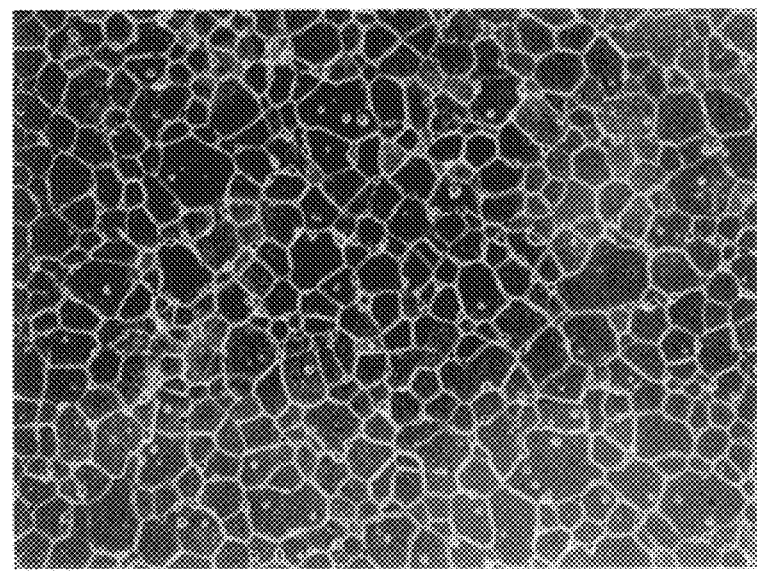
FIG. 4 is a figure-substitute photograph showing a section of a comparative sample.

One sample was randomly selected from the samples of each of Example and Comparative Example and measured for permeability ($\mu_1$ and $\mu_{100}$) at 10 kHz and a magnetic flux density of 10 and 100 millitesla. The sample of Example exhibited $\mu_1$ of 32,500 and $\mu_{100}$ of 49,700, with $\mu_{100}/\mu_1$ being equal to 1.53. The sample of Comparative Example exhibited $\mu_1$ of 12,500 and $\mu_{100}$ of 13,900, with $\mu_{100}/\mu_1$ being equal to 1.11. A cross section of the sample of Example or Comparative Example was polished and photographed under an optical microscope, the photographs being shown in FIGS. 3 and 4.

Example 2

Core Samples 12 to 16 of Example and Comparative Example were prepared as in Example 1. With respect to the composition of manganese-zinc ferrite, the main components were the same as in Example 1. As to the auxiliary components, for Samples 12 and 13, $CaCO_3$ and $SiO_2$ were added as in Example 1, and for Samples 14 to 16, $CaCO_3$ and $SiO_2$ were omitted and instead, $Bi_2O_3$ and $MoO_3$ were added in the amounts described below.

Sample 12
$Bi_2O_3$: 300 ppm
$MoO_3$: 0
Sample 13
$Bi_2O_3$: 300 ppm
$MoO_3$: 300 ppm
Sample 14
$Bi_2O_3$: 400 ppm
$MoO_3$: 400 ppm
Sample 15
$Bi_2O_3$: 600 ppm
$MoO_3$: 200 ppm
Sample 16
$Bi_2O_3$: 200 ppm
$MoO_3$: 800 ppm The cores of Samples 12 to 16 were measured for initial permeability and other properties as in Example 1, finding the same tendency as in Example 1.

ADVANTAGE OF THE INVENTION

The manganese-zinc ferrite of the present invention exhibits a high initial permeability especially in a low-frequency region of about 10 kHz. Even in a high-frequency region of at least 100 kHz, it also possesses an initial permeability which is at least equal to that of prior art ferrites.

What is claimed is:

1. A method for preparing a manganese-zinc ferrite by firing, characterized in that the firing includes a main temperature holding step at 1,200 to 1,450° C. and a thermal ramp-down step prior to the main temperature holding step, and the lowest temperature reached by the mid-firing thermal ramp-down step is set in the range of 1,150 to 1,400° C. and lower by at least 50° C. than the hold temperature of the main temperature holding step.

2. The method of claim 1, wherein the lowest temperature reached by the mid-firing thermal ramp-down step is lower by 50 to 200° C. than the hold temperature of the main temperature holding step.

3. The method of claim 1, wherein the firing includes only one main temperature holding step at 1,200 to 1,450° C.

4. A method for preparing a manganese-zinc ferrite, comprising, as main components, 50 to 56 mol % calculated as $Fe_2O_3$ of iron oxide, 22 to 39 mol % calculated as MnO of manganese oxide, and 8 to 25 mol % calculated as ZnO of zinc oxide by firing, characterized in that the firing includes a main temperature holding step at 1,200 to 1,450° C. and a thermal ramp-down step prior to the main temperature holding step, and the lowest temperature reached by the mid-firming thermal ramp-down step is set in the range of 1,150 to 1,400° C. and lower by at least 50° C. then the hold temperature of the main temperature holding step, wherein the ferrite comprises a mean crystal grain size of more than 50 $\mu$m to 150 $\mu$m and has an initial magnetic permeability $\mu_1$ of at least 15,000 at 10 kHz.

5. The method of claim 4, wherein the lowest temperature reached by the mid-firing thermal ramp-down step is lower by 50 to 200° C. than the hold temperature of the main temperature holding step.

6. The method of claim 4, wherein the firing includes only one main temperature holding step at 1,200 to 1,450° C.

* * * * *